US008255405B2

(12) United States Patent
Basu et al.

(10) Patent No.: US 8,255,405 B2
(45) Date of Patent: Aug. 28, 2012

(54) TERM EXTRACTION FROM SERVICE DESCRIPTION DOCUMENTS

(75) Inventors: Sujoy Basu, Sunnyvale, CA (US); Sharad Singhal, Belmont, CA (US); Donald E. Young, Portland, OR (US); Mehmet Kivanc Ozonat, Mountain View, CA (US); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 12/363,695

(22) Filed: Jan. 30, 2009

(65) Prior Publication Data

US 2010/0198839 A1 Aug. 5, 2010

(51) Int. Cl.
*G06F 17/30* (2006.01)
(52) U.S. Cl. ........................................................ 707/749
(58) Field of Classification Search .......... 707/736–737, 707/748–749, 750; 706/29, 45, 48, 62
See application file for complete search history.

(56) References Cited

U.S. PATENT DOCUMENTS

| 6,996,575 | B2* | 2/2006 | Cox et al. ................. 707/739 |
| 2003/0225749 | A1* | 12/2003 | Cox et al. ................. 707/3 |
| 2004/0064438 | A1* | 4/2004 | Kostoff ..................... 707/1 |
| 2004/0133574 | A1* | 7/2004 | Bradford ................... 707/8 |
| 2006/0224584 | A1* | 10/2006 | Price ........................ 707/6 |
| 2007/0100875 | A1* | 5/2007 | Chi et al. .................. 707/102 |
| 2007/0266020 | A1* | 11/2007 | Case et al. ................ 707/5 |
| 2008/0086490 | A1* | 4/2008 | Paliwal et al. ............ 707/101 |
| 2009/0125498 | A1* | 5/2009 | Cao et al. .................. 707/5 |
| 2009/0327243 | A1* | 12/2009 | Pradhan et al. .......... 707/3 |

OTHER PUBLICATIONS

Dumais, Using Latent Semantic Anaylsis to Improve Access to Textual Information, 1988, pp. 281-285.
Basu, Service Selection in Business Service Ecosystem, pp. 1-14; Dec. 1, 2008.
Rosario, Latent Semantic Indexing: An Overiew, 2000, pp. 1-16.

* cited by examiner

*Primary Examiner* — Hung T Vy

(57) ABSTRACT

Terms are extracted from service description documents describing desired services, and the terms are used to search for candidate service providers operable to provide the desired services. A matrix of terms and documents are determined from the service description documents. Singular value decomposition (SVD) is used to decompose the matrix. Eigen vectors from the SVD decomposition are weighted by top k singular values in a diagonal matrix S of singular values also generated from the decomposition. The weighted eigen vectors are used to rank terms from the matrix X based on relevance of the terms to the requirements for desired services described in the service description documents.

21 Claims, 7 Drawing Sheets

200

TERM EXTRACTION FROM SERVICE DESCRIPTION DOCUMENTS

BACKGROUND

A world-wide community of service providers has a presence on the Internet, and people seeking services typically go to the Internet to search for service providers. For example, a person seeking printing services may search the Internet for service providers in their area. In another example, a business seeking to enter into a contract for shipping services may search the Internet for service providers to solicit bids.

Using a search engine to find service providers on the Internet that can potentially provide a desired service can be a difficult and time consuming task. Part of the reason for the difficulty is because there is no structured format followed by service providers for providing details on their services. The majority of service providers do not use a structured format or framework, and instead, provide information about their services on their web sites for a user to read. As a result, a user searching for service providers would have to visit each web site, read the content, and make a determination as to whether a service described at web site is the type of service the user desires.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A service as used herein includes the performance of any duties or work for another. The service may be provided over the Internet or may be provided through other means. Examples of services may include web hosting services, medical services, shipping services or any other type of service. User input describing requirements for one or more desired services may be provided in the form of documents, referred to as service description documents, and the service description documents are used to identify service providers that can provide the desired services.

According to an embodiment, user input describing requirements for one or more desired services is provided in the form of documents, referred to as service description documents. Relevant terms describing service requirements are extracted from service description documents and are input to an Internet search engine. Service capability documents (e.g., HTML web pages, PDF documents, etc.) identified by the search engine results are retrieved from the Internet. These documents describe services provided by potential service providers for the desired services, referred to as candidate service providers. Text classification techniques may be used to identify services and service properties from the service capability documents. Candidate service providers are matched with desired services, and ranked based on the similarity of services provided to service requirements for desired services.

Figure 1A:
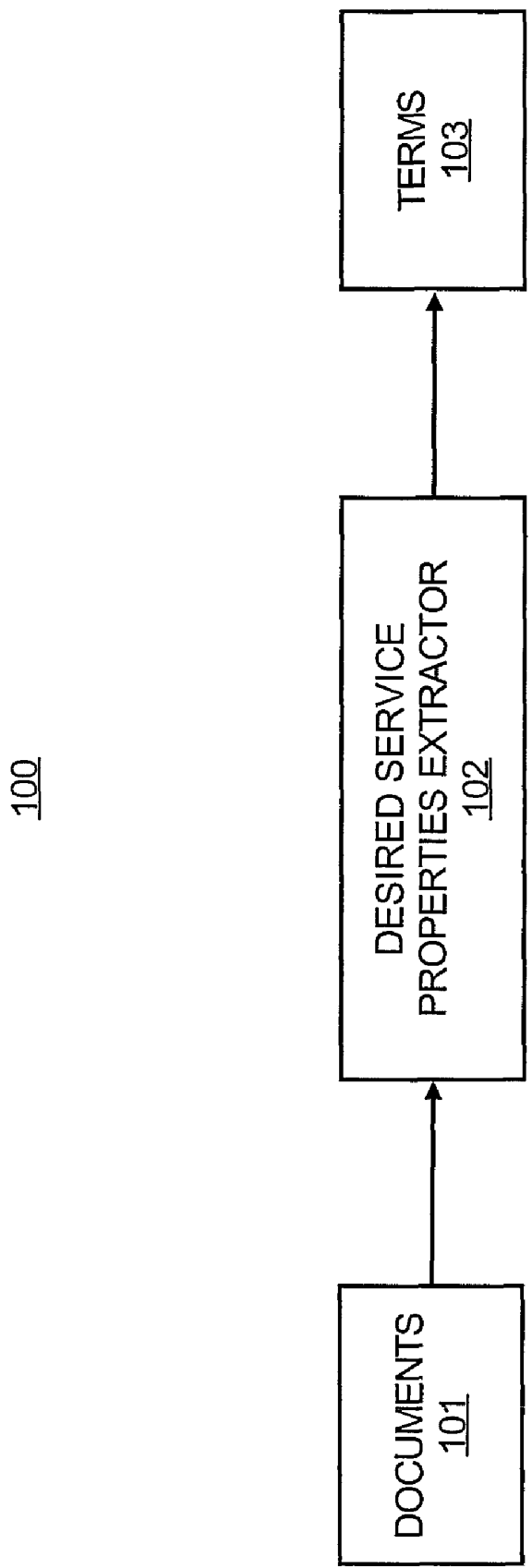
FIGS. 1A-D illustrates data flows and system components used to identify and rank service providers, according to an embodiment.

FIGS. 1A-D illustrate data flows and system components used to identify and rank service providers. FIG. 1A shows extracting a vector of significant terms from service requirements for a desired service. A document 101 includes a description of a desired service, i.e., a service description document. The document 101 may include the requirements for the desired service. In one example, the document 101 is a request for proposal (RFP). The document 101 may be a text document, a pdf document, or may be provided in another known format. A desired service properties extractor 102 receives the document 101 and extracts terms 103 that describe the properties of the desired service from the document 101. In one embodiment, the desired service properties extractor 102 uses singular value decomposition (SVD) to extract the terms 103 from the document 101. The terms 103 may exclude terms from a predetermined set of stop words, which have been previously identified as terms that are not significant.

Figure 1B:
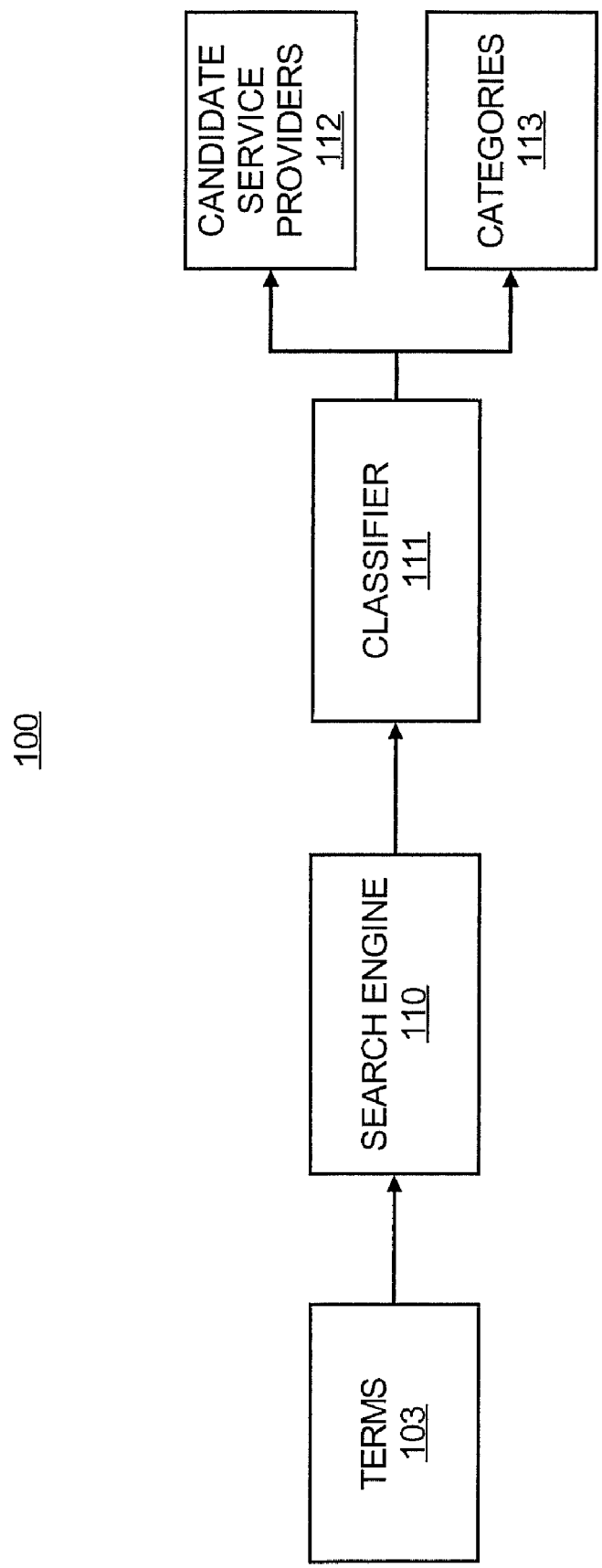

FIG. 1B shows identifying candidate service providers from the Internet. The terms 103 are input to a search engine 110, such as YAHOO or GOOGLE. The search results are provided to a classifier 111 to identify candidate service providers 112 that potentially can provide the desired service. In one embodiment, the classifier 111 can identify different categories of service providers 112 for different categories of desired services. For example, the document 101 may include multiple documents describing different categories of services. The classifier 111 identifies service provider candidates for each of the categories. Note that the search results provided from the search engine 110 to the classifier include service capability documents, such as html documents, text, or other content, extracted from web sites identified by the search engine 110. The classifier 111 then classifies this information into web content for candidate service providers 112 and categories 113.

Figure 1C:
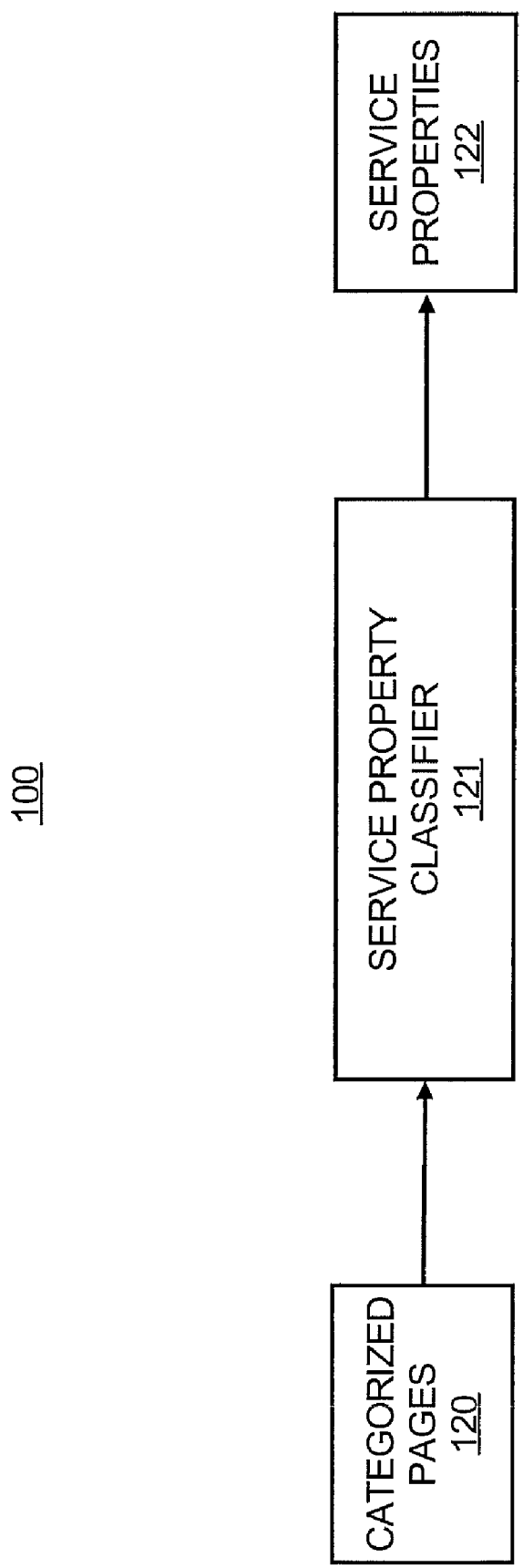

FIG. 1C shows extracting service properties from the web content. Categorized pages 120 include the web content for the candidate service providers 112 and categories 113. A service property classifier 121 identifies service properties 122 from the categorized pages 120. The service properties 122 may include terms from web pages that describe the services of candidate service providers.

Figure 1D:
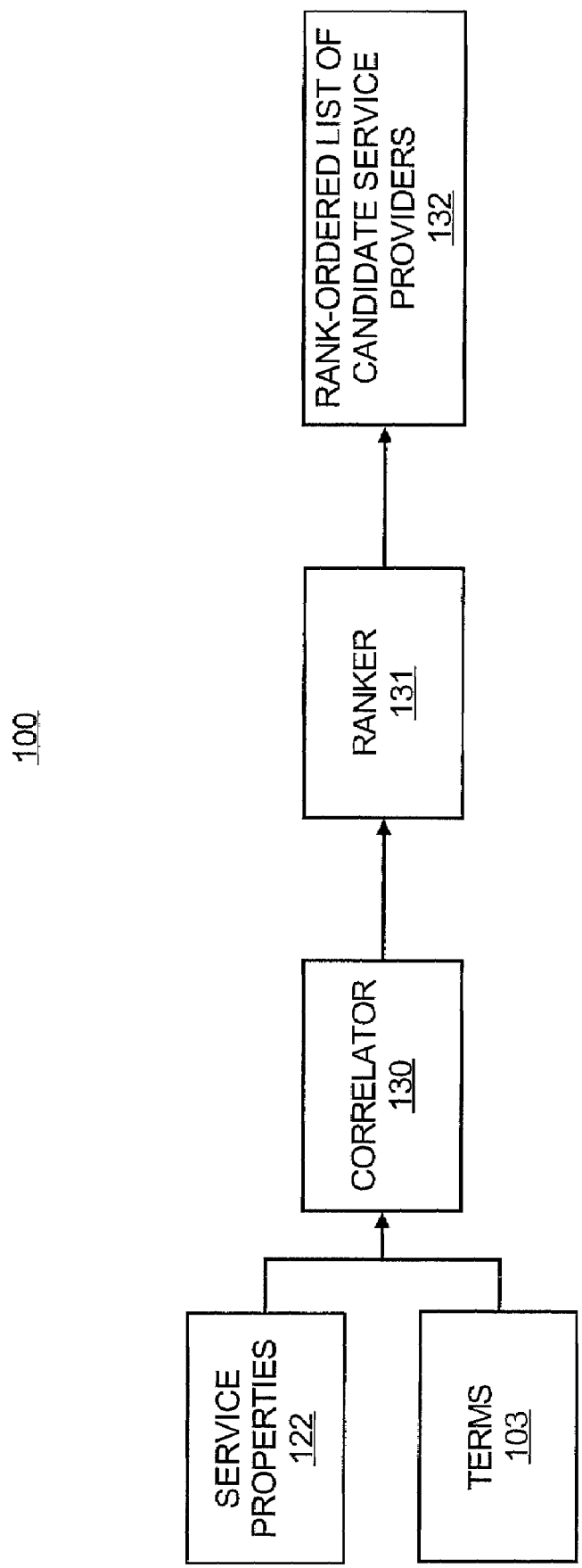

FIG. 1D shows correlating service requirements for a desired service with service properties. The service properties 122 and the terms 103, which may describe service requirements for the desired service, are provided to a correlator 130. The correlator 130 identifies particular service properties 122 that are relevant to the terms 103. From the identified service properties 122 that are relevant to the terms 103, candidate service providers are determined. For example, if a web page includes many of the terms 103, the service provider described in the web page may be selected as a candidate service provider. A ranker 131 ranks the candidate service providers according to criteria. A rank-ordered list 132 of candidate service providers are output by the ranker 131. In one embodiment, latent semantic indexing (LSI) is used to correlate the service properties 122 and the terms 103.

Figure 2:
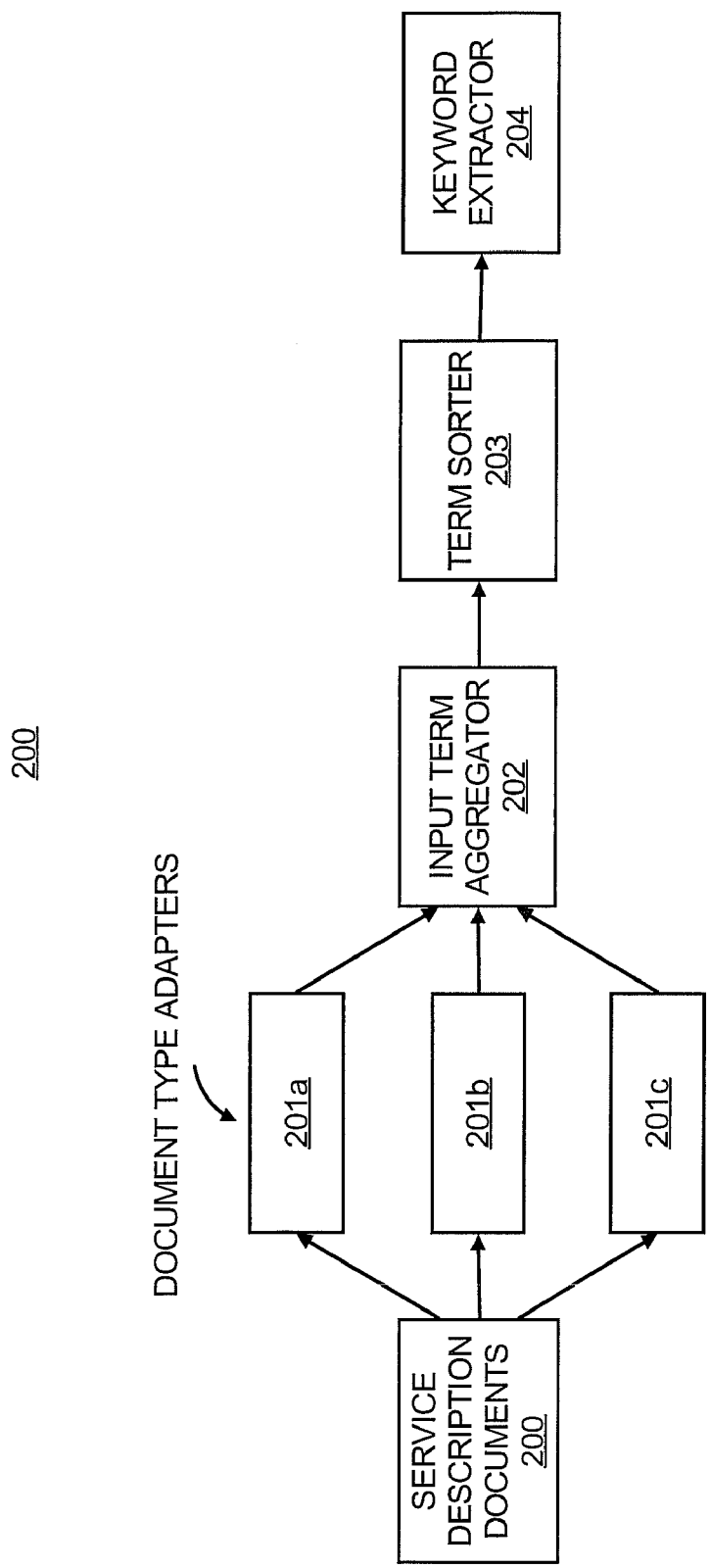
FIG. 2 illustrates a system for extracting terms from service description documents, according to an embodiment.

FIG. 2 illustrates a system 200 for extracting terms from service description documents, according to an embodiment. One or more of the components of the system 200 may be used for the desired service properties extractor 102 shown in FIG. 1A, according to an embodiment. The system 200 includes document type adaptors 201a-c, an input term aggregator 202, a term sorter 203, and a keyword extractor 204.

The documents 101 shown in FIG. 1A may include a set of service description documents 200 describing requirements for one or more desired services. The service description documents 200 may include machine readable electronic documents that exist in various formats and types and that are produced by people using a text processor, a spread sheet or other computer programs.

The document type adaptors 201a-c are able to open and read the documents 200 and produce output documents that are in a type-independent, normalized representation, such as ASCII text. A document type adaptor may be provided for each type of document. For example, document type adaptor 201a normalizes PDF documents. The document type adaptor 201b normalizes WORD documents, and the document type adaptor 201c normalizes EXCEL documents. The documents 200 may be normalized to ASCII text or some other generic format.

The input term aggregator 202 reads the normalized documents and extracts terms from the documents. The extracted terms are combined into a single data structure, such as a matrix X. For example, the matrix X is a term-by-document matrix where the rows represent the terms in each of the documents 200 and the columns represent the documents 200. In another embodiment, the matrix X has rows representing the documents and columns representing the terms. Each cell (row, column) then holds a binary value {0,1} indicating that a term occurs in the document. In another embodiment the cell holds a non-negative integer indicating the frequency of the term in the document.

The terms extracted from the documents may be non-stop word terms. Stop words are words that may not be relevant to the subject matter of the document, such as "the" and "and". A list of predetermined stop-words in the language is used as a filter. All occurrences of these stopwords are removed from the document. The stop words and non-stop words may be predetermined based on language analysis. Also, the extracted terms may be a single word, bigrams or trigrams. A bigram is two words in a predetermined order and a trigram is three words in a predetermined order. The words in the bigrams and trigrams are words that are often used together, such as "sports car".

The term sorter 203 computes the relevance of the terms to the service descriptions of the documents 200. Steps performed by the term sorter and other system components are described in a method 300 below. The term sorter uses SVD to determine the most relevant terms from the matrix X. The term sorter 203 may generate a vector of terms ranked based on relevance. The relevance of each term may be the relevance of each term to one or more service descriptions and requirements in the documents 200.

The keyword extractor 204 extracts the terms from the vector generated by the terms sorter 203. The number of terms extracted may be based on a term relevance threshold for determining a set of the highest ranked terms. The extracted terms are then provided to the search engine 110 shown in FIG. 1B and are used to eventually determine the rank-ordered list of candidate service providers 132.

Figure 3:
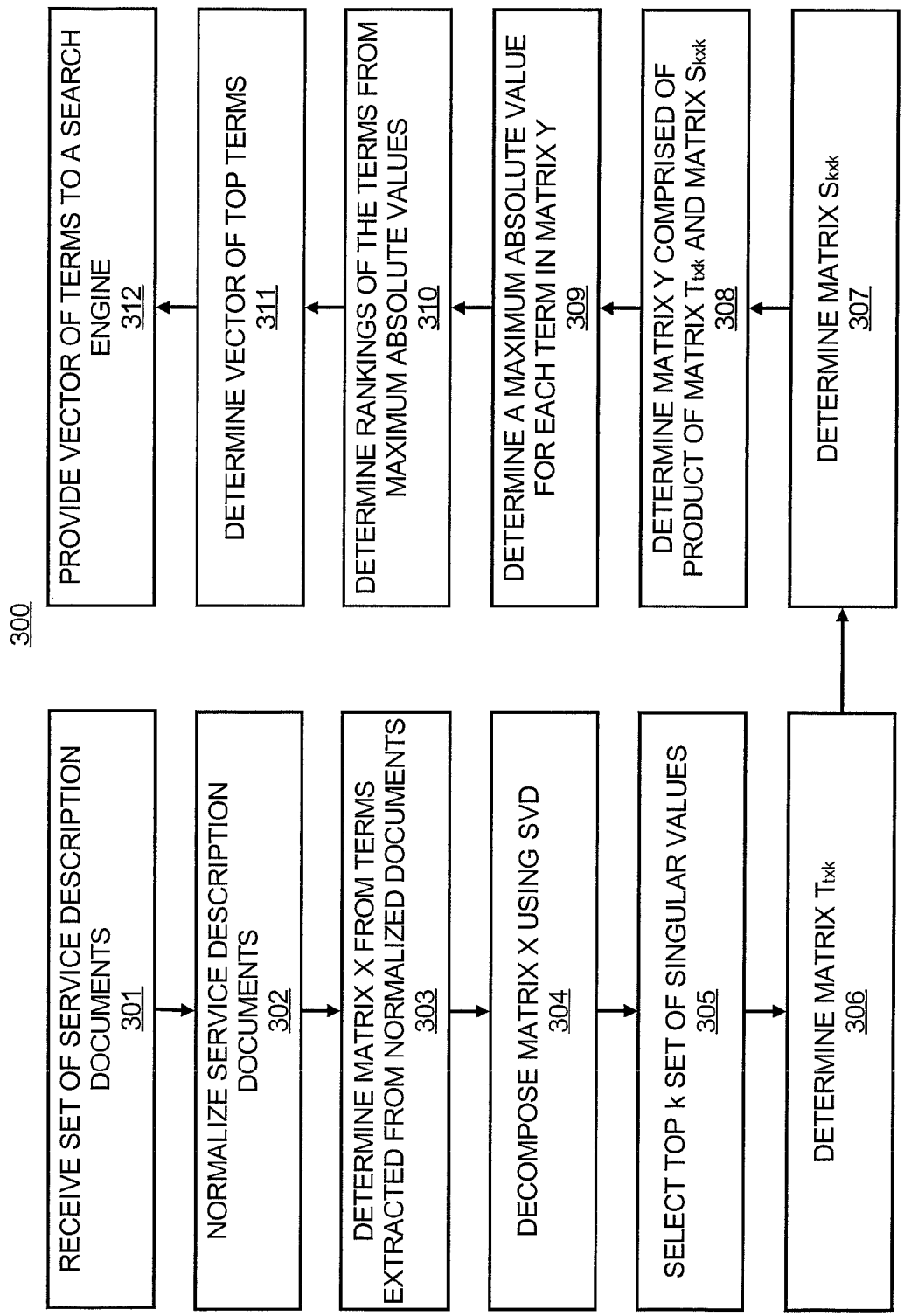
FIG. 3 illustrates a method for determining a vector of terms ranked based on relevance, according to an embodiment.

FIG. 3 describes a method 300 for determining a vector of terms ranked based on relevance, according to an embodiment. The method 300 is described with respect to FIGS. 1-2 by way of example and not limitation. At step 301, a set of service description documents are received. The set of service description documents may be the documents 200 that include one or more documents describing one or more desired services. The descriptions of desired services may include service requirements. A service description document may be a statement of work that is a form filled out by a person. For example, a SOW is created for a marketing campaign at a large customer event. A service provider is sought for printing brochures for the event.

At step 302, the service description documents 200 are normalized. Terms are extracted from normalized service description documents. The documents 200 are normalized to a generic format, such as ASCII text, and the non-stop words are extracted. Document-type adaptors shown in FIG. 2 may be used to normalize different types of service description documents. In one embodiment of step 302, each service description document is normalized as a complete document. In a second embodiment, each service document is partitioned into multiple documents, for example by section, before normalization.

At step 303, the matrix X is determined from terms extracted from the normalized documents. The terms extracted from the set of service description documents may be non-stop words, such as the following terms extracted from a marketing campaign SOW: "print quantity 2,000 colored 8.5×11 z-fold brochures, 100 lb. gloss within 10 days with maximum budget of $1,000". The input aggregator may be used to extract terms and create the matrix X. The matrix X may be a term-by-document matrix. In one embodiment, the matrix includes a row for each term extracted from the set of service description documents and a column for each document in the set of service description documents. One way to describe the matrix X is that the matrix X is a term-by-document matrix, and a dimension of the matrix X is t number of terms by d number of documents, and a value $x_{i,j}$ in the matrix X represents a frequency or an occurrence of a term i in a document j from the set of service description documents. In a second embodiment, the value $x_{i,j}$ in the matrix X is set to 1 if the term i occurs in document j, or to 0 otherwise.

At step 304, the matrix X is decomposed using SVD. SVD is a conventional process for representing a matrix in a lower dimensional space. SVD is described in Dumais, S. T., Furnas, G. W., Landauer, T. K. and Deerwester, S. (1988), "Using latent semantic analysis to improve information retrieval." In *Proceedings of CHI'88: Conference on Human Factors in Computing*, New York: ACM, 281-285. SVD takes a matrix and represents it as another matrix in a lower dimensional space such that the "distance" between the two matrices as measured by the 2-norm is minimized.

Decomposing the matrix X using SVD generates three matrices T, S, and $D^t$, wherein S is a diagonal matrix of singular values ordered in descending order, and T and $D^t$ are matrices of eigen vectors of the square symmetric matrices $XX^t$ and $X^tX$ respectively. Furthermore, the square of the singular values are the eigen values for both $XX^t$ and $X^tX$. The dimension of X is t (number of terms) by d (number of documents), while that of T is t-by-m, where m is the rank of X and is at most the minimum of t and d. S is an m-by-m matrix. Intuitively, SVD transforms the documents (columns of X) and the terms (rows of X) into a common space referred to as the factor space which is lower dimension than X. The singular values in S are weights that are applied to scale the orthogonal, unit-length columns vectors of T and D and determine where the corresponding term or document is placed in the factor space. Similarity between documents or the likelihood of finding a term in a document can be estimated by computing distances between the coordinates of the corresponding terms and documents in this factor space.

At step 305, a top k set of singular values from the matrix S are selected. The top k values, for example, are a set of highest singular values in S. All other singular values in S are set to 0. k is less than the total number of singular values in S and is equal to an integer greater than or equal to 1. A threshold may be used to select the top k values.

The eigenvectors corresponding to the highest eigen values represent principal components that capture the most important characteristics of the data in the matrix X. The eigen values are the singular, non-zero values in the matrix S (i.e., the eigen values are the singular values of the SVD). The contributions keep diminishing for descending eigen values in the matrix S. By dropping some of the lower eigen values and corresponding eigenvectors, some information is lost but the dimensionality of the data is reduced. This is useful when the number of documents is very large. Thus, the top k highest eigen values in the matrix S, and the corresponding eigenvectors in the T and D matrices are kept and the remaining values may be set at zero.

At step 306, a matrix $T_{t \times k}$ containing first k columns of T is determined. txk means t by k, where t is the number of terms from the matrix X and k is the number of top k eigen values selected at step 305.

At step 307, a matrix $S_{k \times k}$ containing an intersection of the first k rows and the first k columns of S is determined. $S_{k \times k}$ is a square matrix of dimensions k-by-k.

At step 308, a matrix Y comprised of the product of the matrix $T_{t \times k}$ and the matrix $S_{k \times k}$ is determined. The product represents eigenvectors from T weighted by the top K singular values in S.

At step 309, a maximum absolute value for each term in the matrix Y is determined. For example, each row of the matrix determined at step 308 represents a term from the documents 200. A maximum absolute value in each row represents a relevance of a corresponding term for the row.

At step 310, rankings of the terms are determined from the maximum absolute values. For example, the rows of the matrix Y are sorted based on their maximum absolute value. The sorted order of the terms represents the rankings of the terms. For example, 1 is the highest ranking term and has the highest maximum absolute value among all the terms, 2 is the next highest ranking and has the highest maximum absolute value, etc.

At step 311, a vector of the top terms from the list is determined. The top terms are selected based on their maximum absolute values. For example, the terms with maximum absolute values above a threshold are selected. These terms are in the vector in the order determined at step 310.

At step 312, the vector of terms are provided to a search engine to search for candidate service providers on the Internet.

Figure 4:
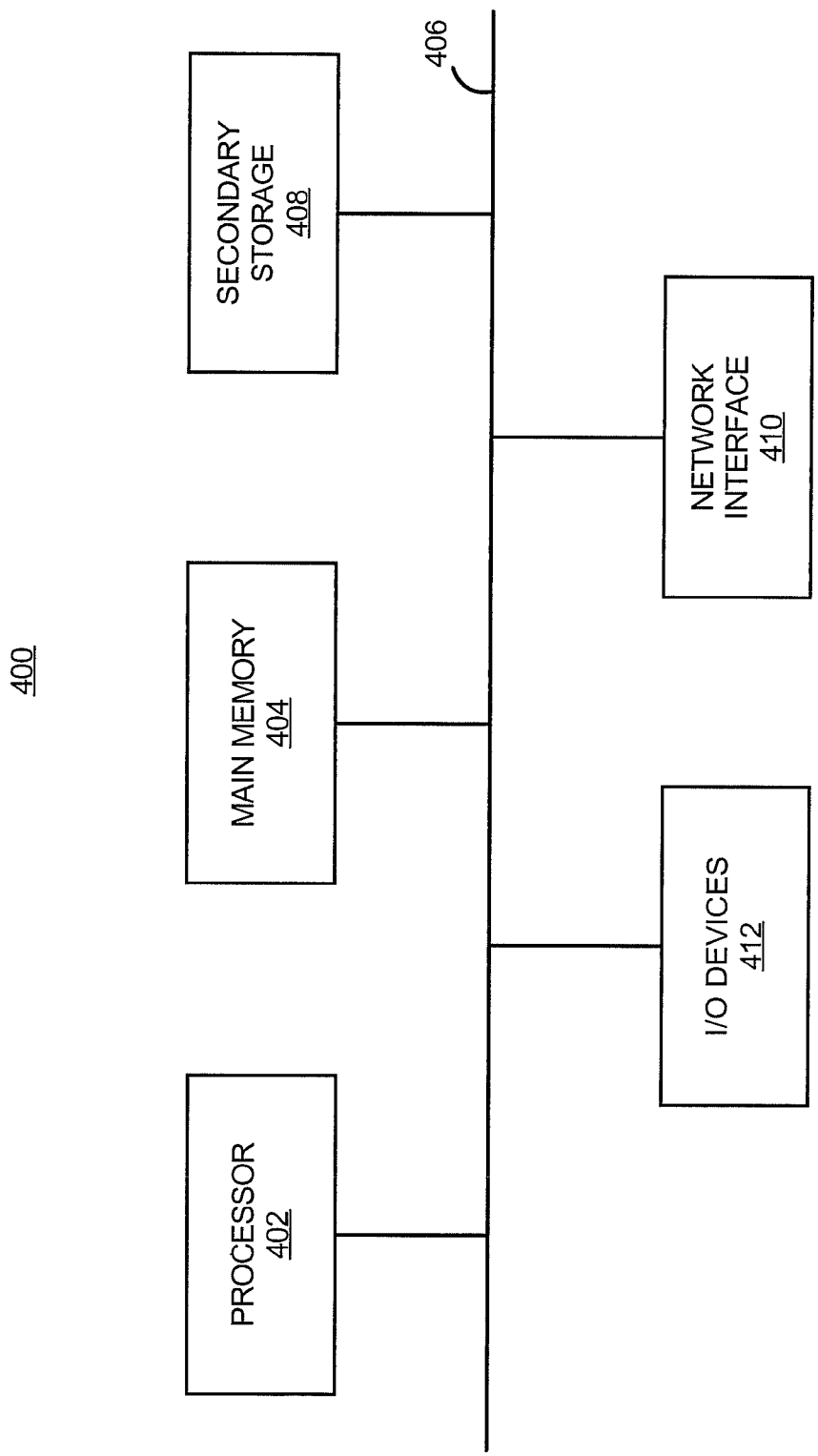
FIG. 4 illustrates a computer system that may be used as a platform for the systems and methods of the embodiments.

FIG. 4 illustrates a block diagram of a general purpose computer system that is operable to be used to execute one or more computer programs implementing the embodiments described herein, including steps described herein. It will be apparent to one of ordinary skill in the art that a more sophisticated computer system is operable to be used. Furthermore, components can be added or removed from the computer system 400 to provide the desired functionality.

The computer system 400 includes one or more processors, such as processor 402, providing an execution platform for executing software. Commands and data from the processor 402 are communicated over a communication bus 406. The computer system 400 also includes computer readable storage mediums including a main memory 404, such as a Random Access Memory (RAM), where software is resident during runtime, and a secondary storage 408. The secondary storage 408 includes, for example, a hard disk drive and/or a removable storage drive representing a floppy diskette drive, a magnetic tape drive, a compact disk drive, etc., or a non-volatile memory where a copy of the software is stored. In one example, the secondary storage 408 also includes ROM (read only memory), EPROM (erasable, programmable ROM), EEPROM (electrically erasable, programmable ROM). The computer system 400 includes one or more input/output (I/O) devices 412, such as a display, keyboard, a mouse, a stylus, and the like. A network interface 410, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A non-transitory computer readable medium including code that when executed by a computer system performs a method of selecting most relevant terms from service description documents, the method comprising:
   receiving a set of service description documents;
   determining a term-by-document matrix X using terms extracted from documents in the set of service description documents, wherein the matrix X includes a first dimension listing each of the documents, a second dimension listing the extracted terms, and a third dimension listing values indicating a frequency of each of the extracted terms occurred in each of the documents;
   decomposing the matrix X using singular value decomposition (SVD) into three matrices T, S, and $D^t$, wherein S is a diagonal matrix of singular values ordered in descending order, and T and $D^t$ are matrices of eigen vectors;
   selecting k singular values from S, where k is an integer greater than or equal to 1;
   determining rankings of the terms in the matrix X using the k singular values; and
   selecting a set of terms from the matrix X based on the rankings.

2. The non-transitory computer readable medium of claim 1, wherein the method further comprises:
   determining a matrix $T_{t \times k}$ containing first k columns of T;
   determining a matrix $S_{k \times k}$ containing an intersection of the first k rows and the first k columns of S; and determining a matrix Y comprised of a product of the matrix $T_{t \times k}$ and the matrix $S_{k \times k}$, wherein the product represents eigen vectors from T weighted by the k singular values in S.

3. The non-transitory computer readable medium of claim 2, wherein the method further comprises:

determining a maximum absolute value associated with each term in the matrix Y, wherein the maximum absolute value represents a relevance of the corresponding term to a service description in one or more of the service description documents; and determining rankings of the terms in the matrix X includes using the maximum absolute values to determine the rankings.

4. The non-transitory computer readable medium of claim 3, wherein selecting a set of terms from the matrix X based on the rankings further comprises:

sorting the terms of the matrix Y based on their maximum absolute values; and selecting terms having maximum absolute values exceeding a term relevance threshold.

5. The non-transitory computer readable medium of claim 1, wherein the second dimension of the matrix X is t number of terms and the first dimension of the matrix X is d number of documents.

6. The non-transitory computer readable medium of claim 1, wherein selecting k singular values from S further comprises:

selecting k singular values from S having values greater than a first threshold.

7. The non-transitory computer readable medium of claim 1, further comprising:

using the set of terms to identify candidate service providers for one or more services described in the set of service description documents.

8. The non-transitory computer readable medium of claim 1, wherein multiple documents in the set of service description documents is generated from a single service description document.

9. The non-transitory computer readable medium of claim 1, wherein the method further comprises:

normalizing the set of service description documents to a single format.

10. A non-transitory computer readable medium including code that when executed by a computer system performs a method comprising:

receiving a set of service description documents describing requirements for one or more desired services;

determining a term-by-document matrix X from the set of documents, wherein the matrix X includes a dimension of t number of terms, a dimension of d number of documents, and a dimension of values indicating a frequency of each of the terms occurred in each of the documents;

using SVD to determine matrices T, S, and $D^t$, wherein S is a diagonal matrix of singular values ordered in descending order, and T and $D^t$ are matrices of eigenvectors;

selecting top k singular values from S;

determining eigen vectors from T weighted by the top k singular values in S; and using the weighted eigen vectors to rank terms from the matrix X based on relevance of the terms to the requirements for one or more desired services in the set of documents.

11. The non-transitory computer readable medium of claim 10, wherein the method further comprises:

determining a matrix $T_{t \times k}$ containing first k columns of T;

determining a matrix $S_{k \times k}$ containing an intersection of the first k rows and the first k columns of S; and determining a matrix Y comprised of a product of the matrix $T_{t \times k}$ and the matrix $S_{k \times k}$, wherein the product is a matrix of the weighted eigen vectors.

12. The non-transitory computer readable medium of claim 11, wherein the method further comprises:

determining a maximum absolute value in each row of the matrix Y associated with a term of the matrix X, wherein the maximum absolute value in each row represents a relevance of a corresponding term for the row; and the ranks of the terms in the matrix X include ranks determined from the maximum absolute values.

13. The non-transitory computer readable medium of claim 12, wherein the method further comprises:

sorting the rows of the matrix Y based on their maximum absolute values; and selecting terms for the rows having maximum absolute values exceeding a threshold.

14. The non-transitory computer readable medium of claim 13, wherein the method further comprises:

using the selected terms to identify candidate service providers for one or more services described in the set of service description documents.

15. The non-transitory computer readable medium of claim 10, wherein multiple documents in the set of service description documents is generated from a single service description document.

16. The non-transitory computer readable medium of claim 10, wherein the method further comprises:

normalizing the set of service description documents to a single format.

17. A computer system comprising:

an interface receiving a set of service description documents; and one or more processors executing code to perform a method including determining a term-by-document matrix X from the set of service description documents, wherein the matrix X includes a dimension of t number of terms, a dimension of d number of documents, and a dimension of values indicating a frequency of each of the terms occurred in each of the documents;

decomposing the matrix X using singular value decomposition (SVD) into three matrices T, S, and $D^t$, wherein S is a diagonal matrix of singular values ordered in descending order, and T and $D^t$ are matrices of eigen vectors;

selecting top k singular values in S, where k is less than a total number of non-zero singular values in S;

determining eigen vectors from T weighted by the top k singular values in S; and using the weighted eigen vectors to rank terms from the matrix X based on relevance of the terms to the requirements for one or more desired services in the set of documents.

18. The computer system of claim 17, wherein the method further comprises:

determining a matrix $T_{t \times k}$ containing first k columns of T;

determining a matrix $S_{k \times k}$ containing an intersection of the first k rows and the first k columns of S; and determining a matrix Y comprised of a product of the matrix $T_{t \times k}$ and the matrix $S_{k \times k}$, wherein the product is a matrix of the weighted eigen vectors.

19. The computer system of claim 18, wherein the method further comprises:

determining a maximum absolute value in each row of the matrix Y associated with a term of the matrix X, wherein the maximum absolute value in each row represents a relevance of a corresponding term for the row; and the ranks of the terms in the matrix X include ranks determined from the maximum absolute values.

20. The computer system of claim 19, wherein the method further comprises:

sorting the rows of the matrix Y based on their maximum absolute values; and selecting terms for the rows having maximum absolute values exceeding a threshold.

21. A method of selecting most relevant terms from service description documents, comprising:

receiving a set of service description documents;

determining, by a processor, a term-by-document matrix X using terms extracted from documents in the set of service description documents, wherein the matrix X includes a first dimension listing each of the documents, a second dimension listing the extracted terms, and a third dimension listing values indicating a frequency of each of the extracted terms occurred in each of the documents;

decomposing the matrix X using singular value decomposition (SVD) into three matrices T, S, and $D^r$, wherein S is a diagonal matrix of singular values ordered in descending order, and T and $D^r$ are matrices of eigen vectors;

selecting k singular values from S, where k is an integer greater than or equal to 1;

determining rankings of the terms in the matrix X using the k singular values; and selecting a set of terms from the matrix X based on the rankings.

* * * * *